Patented Nov. 21, 1933

1,936,091

UNITED STATES PATENT OFFICE 1,936,091

PRODUCTION OF ARYL KETONES

Alphons O. Jaeger, Mount Lebanon, Pa., assignor to The Selden Company, Pittsburgh, Pa., a corporation of Delaware No Drawing. Application July 30, 1931
Serial No. 554,079

16 Claims. (Cl. 260—64)

This invention relates to processes of producing aryl ketones and more particularly to producing ketones in which the CO group joins a polynuclear to a mono or polynuclear radical.

The simplest ketone of the class is naphthylphenyl ketone or, as it is sometimes referred to, naphthophenone. According to the present invention these ketones are produced by splitting off carbon dioxide from the corresponding keto aromatic acids. Thus, for example, naphthophenone is obtained by splitting off the carbon dioxide from naphthoylbenzoic acid. The splitting is effected by heating the acids at high temperature, for example 150–350° C., in the presence of small amounts of metals or metal oxides acting as catalysts.

Among the keto aromatic acids which may be treated to produce ketones by the present invention are the naphthoylbenzoic acids referred to above, including their substituted and hydrogenated derivatives such as tetrahydronaphthoylbenzoic acid, the corresponding acids from anthracene, phenanthrene, fluorene, acenaphthene, diphenyl etc. and their derivatives. In addition to the above acids which can be prepared easily by the Friedel-Crafts reaction from phthalic anhydride, similar keto acids obtained by the Friedel-Crafts reaction from other aromatic dibasic acids, such as naphthalic or diphenic acid, may be used in the process of the present invention and are included therein.

The metals which may be used as catalysts include zinc, copper, cadmium, nickel, cobalt, iron, silver, aluminum, titanium, zirconium, lead, thorium, vanadium, chromium, molybdenum, tungsten, manganese, metals of the platinum group, and in general metals which are not sufficiently strong bases to prevent the evolution of carbon dioxide. Therefore, such metals as the alkali metals and alkaline earth metals are excluded. The metals themselves may be used or their oxides, carbonates, or other unstable compounds including metal salts of the keto aromatic acids themselves. It should be noted that in the present invention the metal compounds, which may be used singly or in mixtures, are employed as catalysts, that is to say in amounts considerably less than the molecular equivalents. I do not claim the treatment with steam of keto aromatic acid salts or of mixtures of keto aromatic acids with molecular or substantially molecular equivalents in the present invention. On the contrary, the present invention is limited to heating the acids themselves with relatively small amounts of the metals or metal compounds as catalysts.

The invention will be described in greater detail in connection with the following specific examples.

Example 1

Naphtholybenzoic acid is heated with from ¼–6% of zinc oxide or copper oxide or a mixture of the two, the temperature being kept between 250 and 300° C. and the mixture being vigorously stirred until evolution of carbon dioxide ceases. The naphthylphenylketone is distilled off by means of steam and is obtained in a state of satisfactory purity with good yields.

Example 2

Tetrahydronaphthoylbenzoic acid is heated under the conditions of Example 1 with a catalyst consisting of 2% of metallic copper or metallic nickel or 8–12% of copper or nickel tetrahydronaphthoylbenzoate. An excellent yield of tetrahydronaphthylphenylketone is obtained.

Example 3

Anthracenoylbenzoic acid is heated under conditions of Example 1 with 12% of the aluminum salt of the acid, a good yield of anthracene phenylketone being obtained.

Example 4

Acenapthtoylbenzoic acid is heated with 5% of zinc oxide under the conditions of Example 1, a good yield of acenaphthylphenylketone being obtained.

Preferably the ketones formed are recovered by steam distillation as this minimizes decomposition and permits operation at moderate temperatures. However, any other suitable method of recovery may be used.

What is claimed as new is:

1. A process of producing diaryl ketones, which comprises heating a keto aromatic acid of the formula

RCOR'COOH in which R is a polynuclear cyclic radical and R' is a mononuclear or polynuclear cyclic radical in the presence of a small amount of a compound of a metal other than an alkali or alkaline earth metal to a temperature at which carbon dioxide is given off and continuing the heating until evolution of carbon dioxide substantially ceases and recovering the ketone formed.

2. A process of producing diaryl ketones, which comprises heating a keto aromatic acid of the formula

RCOR'COOH in which R is a polynuclear cyclic radical and R' is a mononuclear or polynuclear cyclic radical in the presence of a small amount of a metal included in the group consisting of zinc, copper, nickel, aluminum, to a temperature at which carbon dioxide is given off and continuing the heating until evolution of carbon dioxide substantially ceases and recovering the ketone formed.

3. A process of producing diaryl ketones, which comprises heating a keto aromatic acid of the formula

RCOR'COOH in which R is a polynuclear cyclic radical and R' is a mononuclear or polynuclear cyclic radical in the presence of a small amount of a zinc compound to a temperature at which carbon dioxide is given off and continuing the heating until evolution of carbon dioxide substantially ceases and recovering the ketone formed.

4. A process of producing diaryl ketones, which comprises heating a keto aromatic acid of the formula

RCOR'COOH in which R is a polynuclear cyclic radical and R' is a mononuclear or polynuclear cyclic radical in the presence of a small amount of a copper compound to a temperature at which carbon dioxide is given off and continuing the heating until evolution of carbon dioxide substantially ceases and recovering the ketone formed.

5. A process of producing diaryl ketones, which comprises heating a keto aromatic acid of the formula $RCOC_6H_4COOH$ in which R is a polynuclear cyclic radical in the presence of a small amount of a compound of a metal other than an alkali or alkaline earth metal to a temperature at which carbon dioxide is given off and continuing the heating until evolution of carbon dioxide substantially ceases and recovering the ketone formed.

6. A process of producing diaryl ketones, which comprises heating a keto aromatic acid of the formula $RCOC_6H_4COOH$ in which R is a polynuclear cyclic radical in the presence of a small amount of a metal included in the group consisting of zinc, copper, nickel, aluminum, to a temperature at which carbon dioxide is given off and continuing the heating until evolution of carbon dioxide substantially ceases and recovering the ketone formed.

7. A process of producing diaryl ketones, which comprises heating a keto aromatic acid of the formula $RCOC_6H_4COOH$ in which R is a polynuclear cyclic radical in the presence of a small amount of a zinc compound to a temperature at which carbon dioxide is given off and continuing the heating until evolution of carbon dioxide substantially ceases and recovering the ketone formed.

8. A process of producing diaryl ketones, which comprises heating a keto aromatic acid of the formula $RCOC_6H_4COOH$ in which R is a polynuclear cyclic radical in the presence of a small amount of a copper compound to a temperature at which carbon dioxide is given off and continuing the heating until evolution of carbon dioxide substantially ceases and recovering the ketone formed.

9. A method according to claim 5, in which the acid is a naphthoylbenzoic acid.

10. A method according to claim 6, in which the acid is a naphthoylbenzoic acid.

11. A method according to claim 7, in which the acid is naphthoylbenzoic acid.

12. A method according to claim 8, in which the acid is naphthoylbenzoic acid.

13. A method according to claim 1, in which the metal compound is a salt of the keto acid itself.

14. A method according to claim 2, in which the metal compound is a salt of the keto acid itself.

15. A method according to claim 5, in which the metal compound is a salt of the keto acid itself.

16. A method according to claim 6, in which the metal compound is a salt of the keto acid itself.

ALPHONS O. JAEGER.